May 20, 1958
S. M. WALDOW
2,835,759
ACCELEROMETER APPARATUS
Filed Dec. 2, 1955
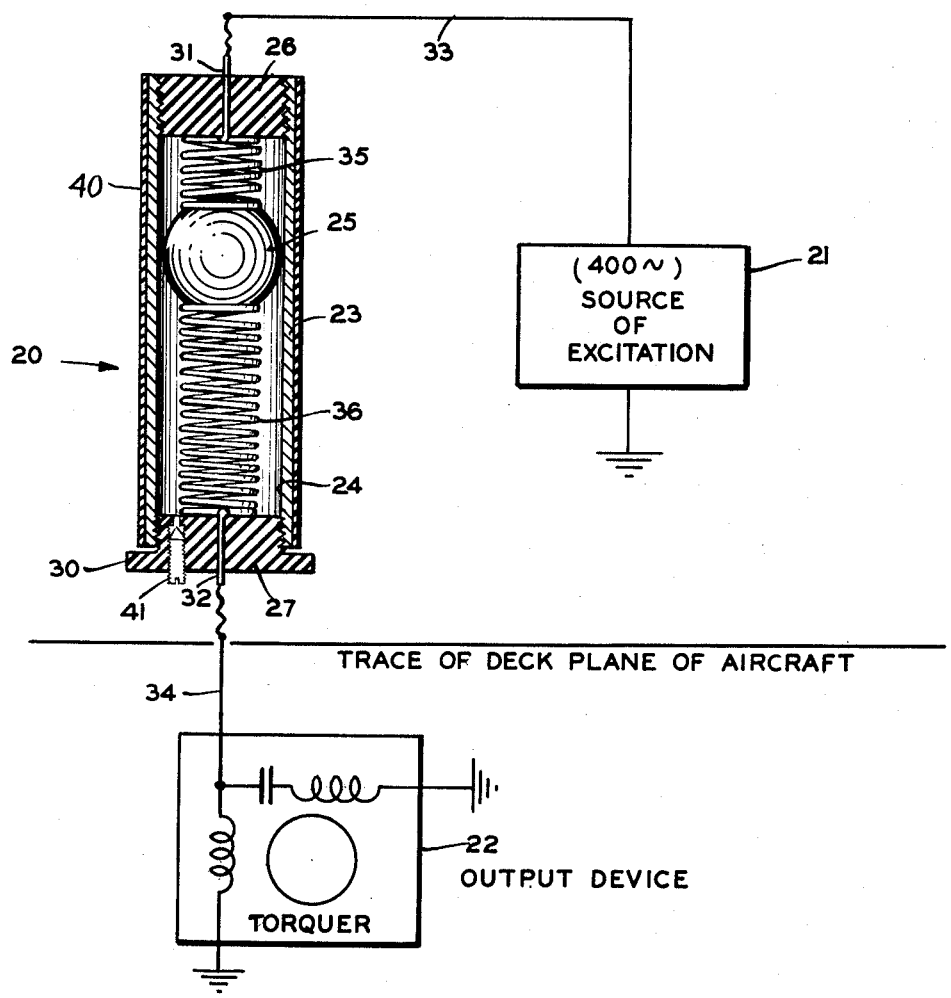
INVENTOR.
SHELDON M. WALDOW
BY
ATTORNEY

United States Patent Office 2,835,759
Patented May 20, 1958

2,835,759

ACCELEROMETER APPARATUS

Sheldon M. Waldow, Fort Lee, N. J., assignor to Bendix Aviation Corporation, Teterboro, N. J., a corporation of Delaware Application December 2, 1955, Serial No. 550,621

3 Claims. (Cl. 200—61.53)

This invention relates to accelerometer apparatus, and more particularly to accelerometer switching means for controlling operation of an electrical circuit.

The device of the present invention has application, for example, where it is necessary or desirable to open a circuit under acceleration. Such may be the case in directional and vertical gyros, where the erection systems may impose errors on instrument accuracy under acceleration. By opening the erection circuit this error can be greatly minimized.

The problem of erection system cut-out can be attained by the use of a rate gyro. The rate gyro senses turn acceleration because of its sensitivity to rate of turn. However, a rate gyro is a much larger, more expensive, and more complex device than the accelerometer of the present invention. Also, this present accelerometer is not limited in use to detecting only turn accelerations, and thus has wider application.

An object of the invention is to provide a novel accelerometer apparatus.

A further object is the provision of novel air damped accelerometer switching means.

Another object of the invention is to provide novel accelerometer switching apparatus usable for controlling an electrical circuit.

A further object is to provide novel accelerometer switching apparatus which is comparatively small in size, has a minimum of moving parts, and approaches frictionless design.

Another object is to provide accelerometer switching means which include resilient means for mechanically balancing a mass and providing electrical contactors.

The present invention contemplates an air damped accelerometer cut-out switch which employs a steel ball movable within a metallic cylinder such as steel so that there is a close fit of substantially frictionless design between the mass and the cylinder. End caps of electrical insulating material each have a spring secured thereto for engaging opposed surfaces of the spherical metallic mass disposed therebetween to hold said mass balanced and to act as electrical contactors. The springs are such when adjusted that the switch will open when subjected to acceleration of a predetermined value and close when acceleration is less than said predetermined value.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

The single figure of the drawing shows the accelerometer switching means connected to a source of energy and an electrical circuit to be controlled.

Referring to the single figure of the drawing there is shown an accelerometer switching means 20 electrically connected between a source of excitation 21 and an output device 22 which is electrically controlled by said accelerometer switching means.

In the present showing the accelerometer switching means 20 utilizes a cylindrical element 23 which may be made of any suitable material having characteristics such that an adequate symmetrical cylindrical opening or surface 24 may be formed interiorly of said cylindrical element 23.

In one device, such as the device represented herein, the cylindrical element 23 is made of metal and is machined to have an adequately smooth surface 24 with an inside diameter only slightly larger than the diameter of the spherical mass 25 which in the preferred arrangement is made of steel.

End caps 26 and 27 are preferably made of an electrical insulation material and are threadedly connected in opposite ends of the cylindrical element 23. End cap 27 is adjustable to control contact pressure between the helical springs 35 and 36 and the metallic mass 25. Consequently, the end cap 27 is provided with an annular lip 30 projecting beyond the axial and lateral confines of the cylindrical element 23 to enable one to grip the annular lip 30 with the fingers or a tool for rotating the adjustable end cap.

Each of said end caps 26 and 27 have a semi-rigid electrical conductor such as 31 and 32 respectively, which may be similar to each other, disposed therethrough axially and secured thereto in any convenient manner. The outer ends of said electrical conductors may be tinned to facilitate soldering thereto, a wire conductor, such as 33 and 34. The inner ends of said semi-rigid electrical conductors are secured to helical resilient electrical contactor or springs 35 and 36, respectively. A coating of electrical insulating material 40 covers the outer surface of the element 23.

Each of the helical springs are axially disposed in its respective end of the steel cylinder and is mounted so that the free ends of said helical springs, which are shaped to engage opposed surfaces of the mass 25 and encompass a circular area thereof, may adequately engage said mass 25 to properly centralize same laterally within the cylindrical element to minimize friction between the mass 25 and the inner cylindrical surface 24.

It will be noted that the axial length of the helical spring 35 is much shorter than that of the spring 36 to reduce the lateral axial movement of the free end of spring under operating conditions to prevent spring 35 from making electrical contact with the surface 24 of the metallic cylindrical element 23. The relatively short length of helical spring 35 prevents lateral displacement of the spring from making an electrical contact that would provide erroneous operation of an associated electrical circuit when the mass 25 and the spring 35 are not in electrical engagement with each other.

The accelerometer switching means in one preferred mounting arrangement has its axis mounted perpendicular to the deck plane of the aircraft and is used to sense turns. A large helical spring deflection for a small force makes the device sensitive to open the circuit quickly.

Under static conditions the ball completes the circuit within the accelerometer. Thus the two springs pressing on the ball permit the flow of current from spring 35 thru ball 25, and spring 36. Under dynamic conditions, that is when acceleration exceeds static conditions by 0.1 g., the ball moves down and breaks contact with spring 35. The circuit is thereby opened. The damping adjusting screw 41 in end cap 27 permits a time delay of approximately 3 seconds. This is to prevent making and breaking of contact due to vibration, and random high frequency acceleration. Upon return to the static condition the ball 25 moves back upward and makes contact with spring 35 once again.

The accelerometer device is shown connected with a source of excitation 21 and a torquer 22, so that when the ball or mass 25 is moved to open the electrical circuit, the torquer circuit is opened accordingly. While a torquer is shown symbolically it is to be understood that a motor or other device may be used.

The low threshold of the accelerometer switch is made possible by eliminating contact rubbing friction between accelerometer mass and electrical conductors. As previously noted this is accomplished by using the accelerometer springs 35 and 36 as conductors thereby providing a continuous circuit directly through the accelerometer mass spring system. Reliable electrical contact is provided by the present arrangement without introducing any rubbing friction between the contactor parts of the switching means.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Accelerometer apparatus comprising a housing including a cylindrical element of an electrical conductive material having an opening at opposite ends thereof, closure means of an electrical insulation material for each opening at the opposite ends of the element and disposed adjacent end areas thereof, resilient electrical conductive means carried by said closure means and extending axially in said cylindrical element in spaced relation to the inner surface thereof, a spherical electrical conductive member located within said cylindrical element in contacting relation with the inner surface thereof and disposed intermediate portions of said resilient means and in contact therewith when said spherical member is in substantially a static condition relative to said housing, one of said portions of the resilient means being of a relatively shorter axial length than the other portion so as to prevent said one portion from making electrical contact with the inner surface of said cylindrical element upon accelerational forces being applied to the spherical member sufficient to bias the member out of contacting relation with said one portion so as to thereby open a control circuit, and means for adjusting said resilient means to provide a predetermined amount of pressure against said spherical member to close said control circuit when said member is in substantially said static condition.

2. Accelerometer apparatus as set forth in claim 1, and wherein said resilient means includes a pair of helical springs in engagement with the spherical member to provide electrical circuit continuity between said resilient means and said spherical member during said static condition.

3. An accelerometer switch mechanism for use in an aircraft to control operation of an electrical circuit; comprising a housing extending perpendicular to the deck plane of the aircraft, electrical conductive resilient means carried within said housing and extending axially from one end of said cylindrical housing to the opposite end thereof, an electrical conductive member disposed intermediate opposite portions of said resilient means, said member having a normal path of movement perpendicular to the deck plane of the aircraft and being operative to move out of electrical contacting relation with one portion of said resilient means to effect a control operation of said electrical circuit when the path of movement of said member deviates substantially from the perpendicular of the deck plane of the aircraft during flight maneuvers of the aircraft, said resilient means including a pair of helical springs and said electrical conductive member including a spherical electrical conductive member normally interposed between said springs and in electrical conductive relation with opposing free ends of said helical springs to provide electrical circuit continuity between said spherical member and helical springs, one of said helical springs being of a relatively short axial length sufficient to permit said spherical conductive member to move out of contacting relation with the free end thereof in opposition to the biasing force of the free end of the other spring so as to break the electrical continuity of the circuit during flight maneuvers of the aircraft.

References Cited in the file of this patent

UNITED STATES PATENTS

| | | |
|---|---|---|
| 1,845,848 | Richards | Feb. 16, 1932 |
| 2,475,728 | Smith | July 12, 1949 |

FOREIGN PATENTS

| | | |
|---|---|---|
| 708,105 | France | Apr. 27, 1931 |